(12) United States Patent
Rafferty et al.

(10) Patent No.: US 12,086,635 B2
(45) Date of Patent: Sep. 10, 2024

(54) COMPUTER-BASED SYSTEMS AND/OR COMPUTING DEVICES CONFIGURED FOR THE SCALING OF COMPUTING RESOURCES USING A MACHINE LEARNING MODEL TRAINED TO MONITOR AND/OR PREDICT USAGE OF INFERENCE MODELS

(71) Applicant: Capital One Services, LLC, McLean, VA (US)

(72) Inventors: Galen Rafferty, Mahomet, IL (US); Reza Farivar, Champaign, IL (US); Anh Truong, Champaign, IL (US); Mark Watson, Urbana, IL (US); Vincent Pham, Seattle, WA (US); Austin Walters, Savoy, IL (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 479 days.

(21) Appl. No.: 17/538,658

(22) Filed: Nov. 30, 2021

(65) Prior Publication Data

US 2023/0168932 A1 Jun. 1, 2023

(51) Int. Cl.
*G06F 9/50* (2006.01)
*G06F 11/34* (2006.01)
*G06F 21/62* (2013.01)
*G06N 20/00* (2019.01)

(52) U.S. Cl.
CPC .......... *G06F 9/5016* (2013.01); *G06F 9/5027* (2013.01); *G06F 11/3409* (2013.01); *G06F 21/6245* (2013.01); *G06N 20/00* (2019.01)

(58) Field of Classification Search
CPC .. G06F 9/5016; G06F 9/5027; G06F 11/3409; G06F 21/6245; G06F 2209/5019; G06F 9/505; G06N 20/00; G06N 5/04
See application file for complete search history.

(56) References Cited

U.S. PATENT DOCUMENTS

| 7,009,939 | B2 * | 3/2006 | Baker ................. H04L 12/5601 370/468 |
| 9,830,175 | B1 | 11/2017 | Wagner |
| 10,235,625 | B1 | 3/2019 | Walters et al. |
| 10,360,067 | B1 | 7/2019 | Wagner |

(Continued)

*Primary Examiner* — Jorge A Chu Joy-Davila
(74) *Attorney, Agent, or Firm* — Greenberg Traurig, LLP

(57) ABSTRACT

An example method includes receiving historical usage data associated with computing services provided by distributed servers and an inference model. The inference model is configured to receive a request and make an inference based on the request. The method further includes training a machine learning model to determine a correlation between usage of a first computing service of the and usage of the inference model. The correlation indicates that a first spike in usage of the first computing service precedes a second spike in usage of the inference model. The method further includes receiving, in real-time, current usage data associated with the first computing service. The method further includes determining, based on the current usage data and the correlation, that the current usage data is indicative of the first spike in usage of the first computing service that precedes the second spike in usage of the inference model.

20 Claims, 9 Drawing Sheets

(56) References Cited

U.S. PATENT DOCUMENTS

| | | |
|---|---|---|
| 10,365,985 B2 | 7/2019 | Wagner |
| 10,547,522 B2 | 1/2020 | Hutchison et al. |
| 10,755,338 B1 | 8/2020 | Truong et al. |
| 2019/0164080 A1* | 5/2019 | Stefani ................ G06F 9/45558 |
| 2020/0097851 A1* | 3/2020 | Alvarez ............. G05B 13/0265 |
| 2020/0289925 A1* | 9/2020 | Norton ................. A63F 13/355 |
| 2021/0357255 A1* | 11/2021 | Mahadik ............. G06F 11/3006 |
| 2023/0099001 A1* | 3/2023 | Harutyunyan ........ G06F 11/079 |
| | | 714/25 |

* cited by examiner

COMPUTER-BASED SYSTEMS AND/OR COMPUTING DEVICES CONFIGURED FOR THE SCALING OF COMPUTING RESOURCES USING A MACHINE LEARNING MODEL TRAINED TO MONITOR AND/OR PREDICT USAGE OF INFERENCE MODELS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-based platforms/systems, improved computing devices/components and/or improved computing objects configured for one or more novel technological applications of training a machine learning model to monitor and/or predict usage of computing services and inference models to scale up or down computing resources for use by those computing services and/or inference models.

BACKGROUND OF TECHNOLOGY

A computer network platform/system may include a group of computers (e.g., client devices (e.g., laptops, desktop computers, tablets, smartphone devices, internet of things (IOT) devices, etc.), servers, wireless routers or other networking devices) and other computing hardware devices that are linked together through one or more communication channels to facilitate communication and/or resource-sharing, including for monitoring and/or predicting usage of computing services and inference models to scale up or down computing resources for use by those computing services and/or inference models.

SUMMARY OF DESCRIBED SUBJECT MATTER

In some embodiments, the present disclosure provides an exemplary technically improved computer-based method that includes at least receiving, by one or more processors of one or more computing devices, historical usage data associated with a plurality of computing services provided by a plurality of distributed servers. The method also includes receiving historical data associated with an inference model associated with at least one of the plurality of computing services. The inference model is configured to receive a request and make an inference based on the request. The method further includes training, by the one or more processors based on the historical usage data, a machine learning model to determine a correlation between a first usage of at least one first computing service of the plurality of computing services and a second usage of the inference model. The correlation indicates that at least one first spike in the first usage of the at least one first computing service precedes at least one second spike in the second usage of the inference model. The method further includes receiving, by the one or more processors, in real-time, current usage data associated with the at least one first computing service of the plurality of computing services. The method further includes determining, by the one or more processors based on the current usage data and the correlation, in real-time, that the current usage data is indicative of the at least one first spike in the first usage of the at least one first computing service that precedes the at least one second spike in the second usage of the inference model. The method further includes transmitting, by the one or more processors in response to the determination that the current usage data is indicative of the at least one first spike in the first usage of the at least one first computing service, in real-time, at least one command to increase an amount of computing resources available for an execution of the inference model.

In some embodiments, the present disclosure provides an exemplary technically improved computer-based system that includes at least the following components of a memory and at least one processor coupled to the memory. The processor is configured to receive historical usage data associated with a plurality of computing services provided by a plurality of distributed servers. The processor is further configured to receive historical usage data associated with an inference model associated with at least one of the plurality of computing services. The inference model is configured to receive a request and make an inference based on the request. The processor is further configured to train, based on the historical usage data, a machine learning model to determine a correlation between a first usage of at least one first computing service of the plurality of computing services and a second usage of the inference model. The correlation indicates that at least one first spike in the first usage of the at least one first computing service precedes at least one second spike in the second usage of the inference model. The processor is further configured to generate, based on the correlation, resource scheduling instructions configured to, upon execution by a computing device, increase an amount of computing resources available for an execution of the inference model in response to making a determination, in real-time, that current usage data of the at least one first computing service indicates the at least one first spike in the first usage of the at least one first computing service.

In some embodiments, the present disclosure provides an exemplary technically improved non-transitory computer readable medium having instructions stored thereon that, upon execution by a computing device, cause the computing device to perform operations including receiving resource scheduling instructions configured to, upon execution by the computing device, increase an amount of computing resources available for an execution of an inference model. The resource scheduling instructions are associated with a correlation between a first usage of at least one first computing service of the plurality of computing services and at least one second usage of the inference model. The correlation indicates that at least one first spike in the first usage of the at least one first computing service precedes at least one second spike in the second usage of the inference model. The plurality of computing services are provided by a plurality of distributed servers. The inference model is configured to receive a request and make an inference based on the request. The instructions further cause the computing device to perform operations including executing the resource scheduling instructions by receiving, in real-time, the current usage data associated with the at least one first computing service. The instructions further cause the computing device to perform operations including executing the resource scheduling instructions by determining, in real-time, that the current usage data is indicative of the at least one first spike in the first usage of the at least one first computing service that precedes the at least one second spike in the second usage of the inference model. The instructions further cause the computing device to perform operations including executing the resource scheduling instructions by transmitting, in response to the determining that the current usage data is indicative of the at least one first spike in the first usage of the at least one first computing service, in real-time, at least one command to increase the amount of computing resources available for the execution of the inference model.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
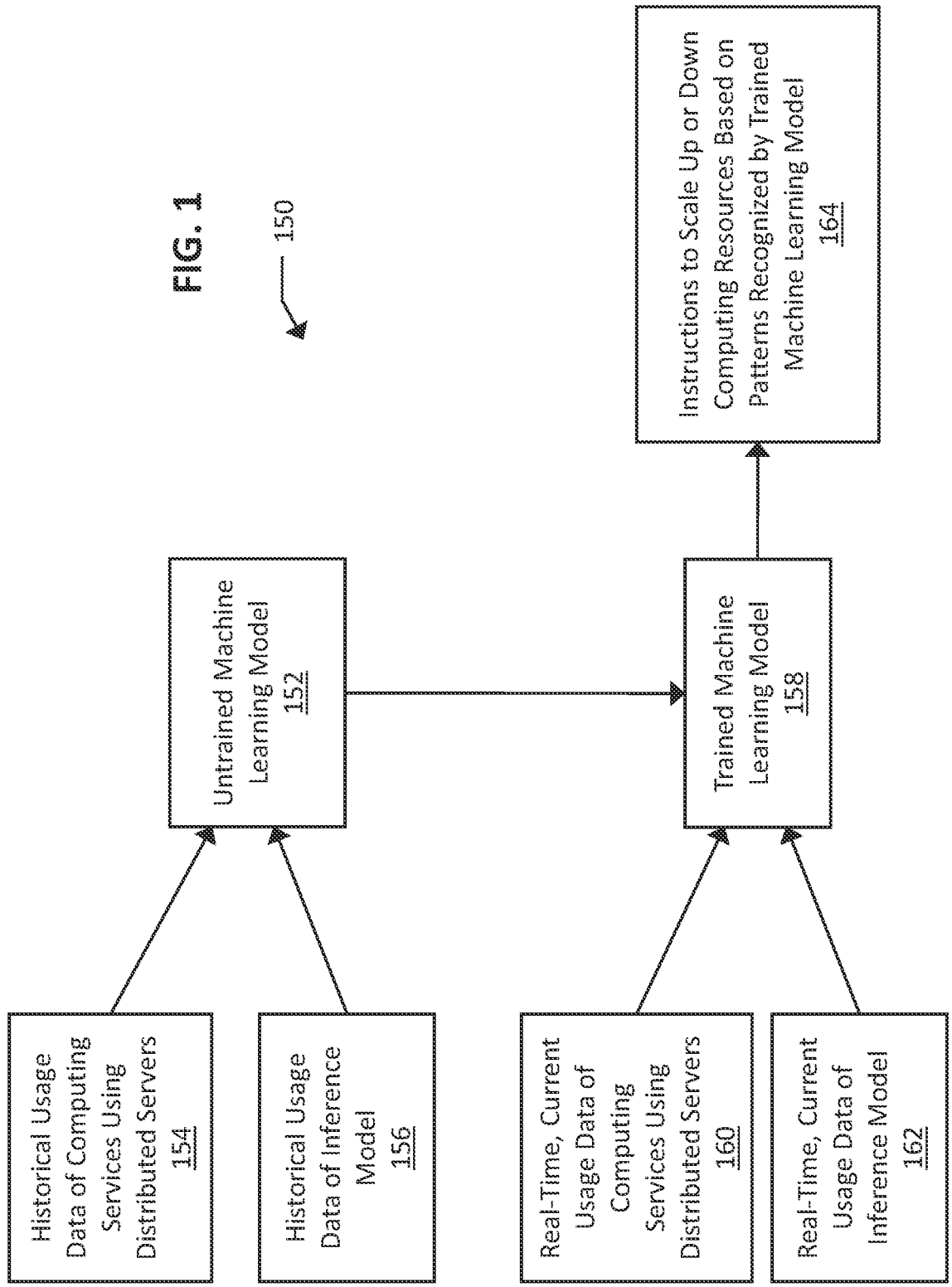
FIG. 1 is a diagram illustrating a system for training a machine learning model and using that machine learning model to monitor and/or predict usage of computing services and inference models to scale up or down computing resources for use by those computing services and/or inference models in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

Described herein are methods, systems, computer readable media, etc. for training a machine learning model to monitor and/or predict usage of computing services and inference models to scale up or down computing resources for use by those computing services and/or inference models. Various embodiments described herein include technical aspects that provide for more efficient use of computing resources. In particular, by using a trained machine learning model to monitor usage of computing services and/or resources (e.g., a first usage) to determine and predict when usage of an inference model (e.g., a second usage) will scale up or down, the system can predictively increase or decrease computing resources allocated to and/or used by an inference model. The various embodiments described herein therefore further include technical aspects that cause computing services and systems to function better, faster, and with less down time. For example, if computing resources are scaled up before usage of an inference model spikes, the inference model will be able to timely process requests once usage spikes, as the additional computing resources will help the inference model handle the additional usage/traffic. In this way, the inference model and its associated computing resources will have a reduced chance of becoming overloaded, unresponsive, or even crashing due to increased usage and potentially insufficient computing resources for handling a spike in usage/requests into the inference model.

Properly predicting when computing resources may be scaled up or down for an inference model may also reduce the amount of overall computing resources, computing devices or nodes used, average time spent receiving a request and returning a response by an inference model, etc. used in implementing one or more inference models. In other words, if computing resources are properly scaled up or down based on predictions of demand, that scaling can reduce the amount of computing resources, devices, nodes, etc. that may be underutilized in a system, resulting in less overall resources that may be needed to implement a plurality of inference models because resources may be allocated on demand in real time based on which inference models are expected to have spikes or decreases in usage.

In particular, the methods, systems, and computer readable media described herein can be used to study the usage of inference models (e.g., an already trained machine learning model) over time to predict when demand/usage of the inference model will be higher. The system can automatically scale up resources for the inference model based on the expected usage spikes and likewise scale down resources for expected usage decreases. The studying of usage of an inference model may be performed using a machine learning model or algorithm, whereby historical usage data of computing resources, services, and the inference model may be used to train the machine learning model to learn how uses of different computing resources or services are indicative of or predictive of certain usage patterns for the inference model.

Other upstream and/or downstream parts of a computing system from the inference model may also be studied using the machine learning model, and resources for the inference model may be scaled based on use of those other resources. For example, a trained machine learning model trained using usage data of computing systems, services, the inference model, etc. may find that a user often uses a certain computing service or system prior to a call being sent to a given inference model. For example, the inference model may be used to receive inquiries relating to approving end consumers for credit card approval. In such a system, a user may input details about themselves, their income, their employment, etc., and those inputs may be used by the inference model to determine whether the consumer is approved and/or what specifics products or promotions that consumer may be approved for. By training the machine learning model to learn from usage data of the inference model (e.g., second usage) and computing services, devices, and resources (e.g., first usage) that are upstream or downstream from the inference model, the trained machine learning model can determine when to scale up or down computing resources that support the inference model.

For example, the inference model may have times of day, days of the week, certain seasons, holidays, etc. where demand (e.g., number of requests) into the inference model is higher or lower. Thus, the machine learning model may learn from usage data of the inference model (e.g., second usage) times of day, days of the week, certain seasons, holidays, etc. when computing resources for the inference model should be scaled up or down. In order to adjust to that demand, the number of historical inquiries into the inference model may be studied by the machine learning model to predict when more requests for a credit card come in (e.g., on weekend days between Thanksgiving and Christmas). The system can scale up or down computing resources available to the model used to approve or deny credit card applications on those days, times, etc.

Other systems may also be monitored or studied to predict increased or decreased usage of an inference model that may be used to scale up or down resources for an inference model. For example, traffic to a particular website or webpage of a website may be correlated with an eventual increase in requests for credit card applications. For example, if a website has webpages about shopping discounts, promotions, etc., that may be indicative that consumers are planning to do shopping in the near future that may lead to them requesting a new credit card. The machine learning model may learn based on usage data of the inference model (e.g., second usage) and the website (e.g., first usage) how and whether usage of that website (e.g., first usage) is correlated to usage of the inference model (e.g., second usage). For example, the machine learning model may determine an estimated elapsed time or time range in which a request into the inference model may follow a user's interaction with the website or webpage. In this way, an upstream aspect of a computing system may therefore be used to predict future demand on the inference model, in the short term and/or for long term usage study. By receiving new, real-time usage data of the website or webpage, the system can then use the trained machine learning model to predict what demand for the inference model will be and scale the resources accordingly.

The various embodiments described herein therefore provide improved technical solutions for various technical problems that occur in previous methods for providing computing resources for inference models. Adjusting the computing resources for an inference model after a large number of requests have been received at an inference model may be too late, as performance of the inference model may already be significantly impacted (e.g., slowed response times, crashing, failed responses, etc.). Thus, the technical aspects of using a machine learning model to actually predict when an inference model's traffic/requests will increase so that computing resources can be scaled up or down before a change in usage provides a significant technical advantage over systems that cannot predict usage levels of an inference model.

Because the embodiments described herein may result in less overall computing resources being needed to service an inference model over time, the embodiments herein may improve the functioning of various electronic devices. For example, if computing resources for an inference model may be scaled down when use of the inference model is predicted to be lower, fewer computing resources or nodes may be needed to be used to perform various tasks, allowing an overall cloud system to function more efficiently. In particular, servers or other computing devices that are part of a cloud system or other computing system may see decreased loads due to less information being processed and/or stored, or due to information being processed in a more efficient and balanced manner. As such, multiple computing devices may functionally improve based on the systems, methods, and computer readable media described herein.

As such, the methods, systems, and computer readable media described herein represent demonstrable technological improvements over prior systems for scaling computing resources for inference models. In other words, the embodiments herein provide for a particular manner of scaling computing resources for inference models that result in the technical benefits described herein as opposed to conventional or known scaling of computing resources for inference model methods. By scaling computer resources based on predicted demand rather than on-demand, the systems ensure they will not be overloaded by sudden changes in demand. In addition, the factors of safety for the system (how much more computing resources are allocated as compared to expected or possible demand) may be reduced, thereby reducing total computing resources required. Stated another way, the systems described herein may be scaled for-demand rather than on-demand.

In various embodiments, different aspects are described with respect to FIGS. 6-9 that are described in further detail below. Any combination of the various computing components and aspects of FIGS. 6-9 may be used various embodiments described herein. For example, users may use any of client devices 102, 103, 104, or 202a through 202n to interact with computing resources or services as described herein. The client devices 102, 103, 104, or 202a through 202n may communicate with server devices 106, 107, 204, or 213; network databases 207 or 215; and/or one or more cloud components 225 through the networks 105 or 206. Any of the server devices 106, 107, 204, or 213; the network databases 207 or 215; and/or the one or more cloud components 225 may execute or implement the machine learning models or inference models as described herein to train a machine learning model and use that machine learning model to determine when to scale up or down computing resources for one or more inference models. In various embodiments, the client devices 102, 103, 104, or 202a through 202n may additionally or alternatively be used to implement or execute the methods or processes described herein as well. In any event, one or more of the computing devices, systems, etc. may be in communication with any or all of the other devices shown in FIGS. 6-9 to implement the systems and methods described herein. For example, an inference model and/or a machine learning model may be implemented/trained one or more computing devices (e.g., the server devices 106, 107, 204, or 213; the network databases 207 or 215; could components 225), and the current and/or historical usage data of computing services, resources, and/or inference models may be collected, stored, retrieved, and/or processed by any of the computing devices and/or the cloud components described herein. The components shown in FIGS. 6-9 are described in greater detail below after the discussions of FIGS. 1-5.

FIG. 1 is a diagram illustrating a system for training a machine learning model and using that machine learning model to monitor and/or predict usage of computing services (e.g., first usage) and inference models (e.g., second usage) to scale up or down computing resources for use by those computing services and/or inference models in accordance with one or more embodiments of the present disclosure. In particular, FIG. 1 demonstrates how usage data may be input into an untrained machine learning model 152. As described herein, a machine learning model may be stored on and trained using one or more of any of the computing components described herein (e.g., in a distributed computing environment), such as any of the components in FIGS. 6-9. The untrained machine learning model 152 may receive historical usage data of computing services using distributed servers represented at block 154 (e.g., first usage). In other words, historical usage data relating to various upstream or downstream services such as websites, mobile applications (e.g., apps), etc. may be received and input into the untrained machine learning model 152. In various embodiments, the services, resources, and/or devices may be end user facing (e.g., a customer of an entity) or inward facing (e.g., used by an employee or other agent of an entity that controls the computing services, resources, devices, etc.). Historical usage data of the inference model (e.g., second usage), represented by block 156, may also be input into the untrained machine learning model 152 to be used for training the machine learning model 152.

Once sufficient historical data is received by the untrained machine learning model 152, patterns may be recognizable from the historical data such that the untrained machine learning model 152 may be used as a trained machine learning model 158. However, the trained machine learning model 158 may continue to be further trained or refined using additional usage data after it is used predictively as a trained machine learning model 158.

The trained machine learning model 158 may receive real-time, current usage data for the inference model, represented by block 162, and the computing services, devices, resources, etc., represented by block 160. Using the information learned from the historical data during training, the trained machine learning model 158 may use the real-time current usage data of the inference model and/or the upstream or downstream computing services that utilize distributed servers to predict whether demand for the inference model will go up or down, by how much that demand may go up or down, when that demand will go up or down, and for how long the demand will remain higher or lower. These predictions output by the trained machine learning model 158 may then be used to determine, generate, and send instructions to scale up or down computing resources based for the inference model, represented by block 164. The instructions may be sent to a computing device or devices that control allocation of computing resources to one or more inference models, so that the computing resources for the given inference model may be scaled up or down in accordance with the insights from the trained machine learning model 158. In other words, based on the patterns of real-time, current usage of computing services and/or the inference model itself, computing resources for the inference model may be scaled up or down based on the instructions of block 164.

Figure 2:
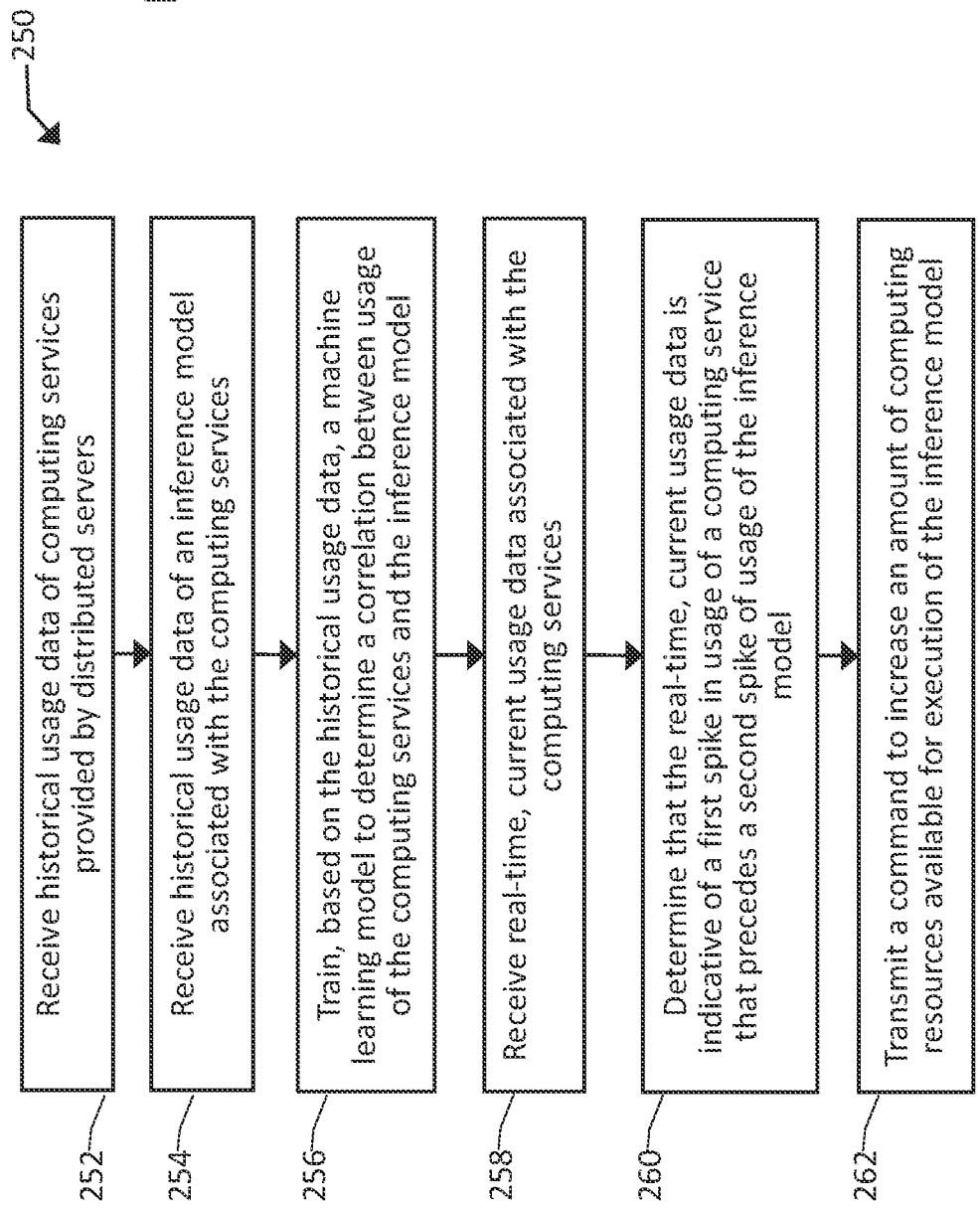
FIG. 2 is a flowchart illustrating a process for training a machine learning model and using that machine learning model to monitor and/or predict usage of computing services and inference models to scale up computing resources for use by those computing services and/or inference models in accordance with one or more embodiments of the present disclosure.

FIG. 2 is a flowchart illustrating a process 250 for training a machine learning model and using that machine learning model to monitor and/or predict usage of computing services and inference models to scale up computing resources for use by those computing services and/or inference models in accordance with one or more embodiments of the present disclosure. At an operation 252, historical usage data associated with a plurality of computing services (e.g., first usage) provided by a plurality of distributed servers is received. The computing services may be one or more of a website provider service, an advertisement provider service, an in-store traffic monitoring service, a transaction or purchase tracking service, or a game console service. In such examples, usage patterns of those services may be determined by the machine learning model/algorithm to be indicative of usage spikes or decreases in the usage of a given inference model(s). In various examples, the receiving of historical usage data may include monitoring, by the one or more computing processors or devices, usage of a computing service by monitoring a number of application programming interface (API) calls into and/or out of the computing service. Since the computing services may be implemented on distributed servers (e.g., a cloud computing system), the historical usage data of the computing services may be received from those distributed servers.

At an operation 254, historical usage data associated with an inference model (e.g., second usage) associated with at least one of the plurality of computing services is received. The inference model may be known to be associated with the plurality of computing services, or that association may be identified by the training of the machine learning model as described herein. As also described herein, an inference model is configured to receive a request and make an inference based on the request, and that inference is returned as a response to the request. The inference model may be, for example, one or more of a credit checking service, a credit limit estimation service, a line of credit approval service, or a transaction fraud protection monitoring service. In another example, the inference model may be an electronic message risk scanning service and the computing service may be an electronic message sending and receiving service. In such an example, increases in the amount traffic on an electronic message sending and receiving service may be indicative of an increased load for the inference model used to scan electronic messages for risk—so computing resources could be allocated to that inference model accordingly as described herein. Since the inference model may be implemented on distributed servers (e.g., a cloud computing system), the historical usage data of the inference model(s) may be received from those distributed servers.

At an operation 256, a machine learning model is trained based on the historical usage data to determine a correlation between a first usage of at least one first computing service of the plurality of computing services and a second usage of the inference model. That correlation may indicate that at least one first spike in the first usage of the at least one first computing service precedes at least one second spike in the second usage of the inference model. In various embodiments, multiple correlations between usage data of the computing services and inference model may be made, where each correlation is representative of a different prediction for what usage of an inference model will look like based on usage of one or more computer services. In various embodiments, if usage data for multiple inference models is input, the machine learning model may also learn correlations between usage of inference models, so that scaling of resources for a first inference model may also be based on usage data of one or more second inference models. These correlations may indicate, for example, a number of queries or requests an inference model is predicted to receive in a future time window.

At an operation 258, current usage data associated with the at least one first computing service of the plurality of computing services is received in real-time. In other words, after the machine learning model is trained, it can be used to receive real-time, current usage data to make predictions based thereon.

At an operation 260, it is determined, based on the current usage data and the correlation, in real-time, that the current usage data is indicative of the at least one first spike in the first usage of the at least one first computing service that precedes the at least one second spike in the second usage of the inference model. At an operation 262, a command is transmitted, in real-time, in response to the determination that the current usage data is indicative of the at least one first spike in the first usage of the at least one first computing service, where the command is transmitted to increase an amount of computing resources available for an execution of the inference model.

The command to adjust computing resources may include one or more of instructions to allocate additional graphics processing units (GPUs) or central processing units (CPUs) for use by the inference model, instructions to allocate additional memory for use by the inference model, or instructions to allocate additional nodes of a cloud computing service for use by the inference model.

Figure 3:
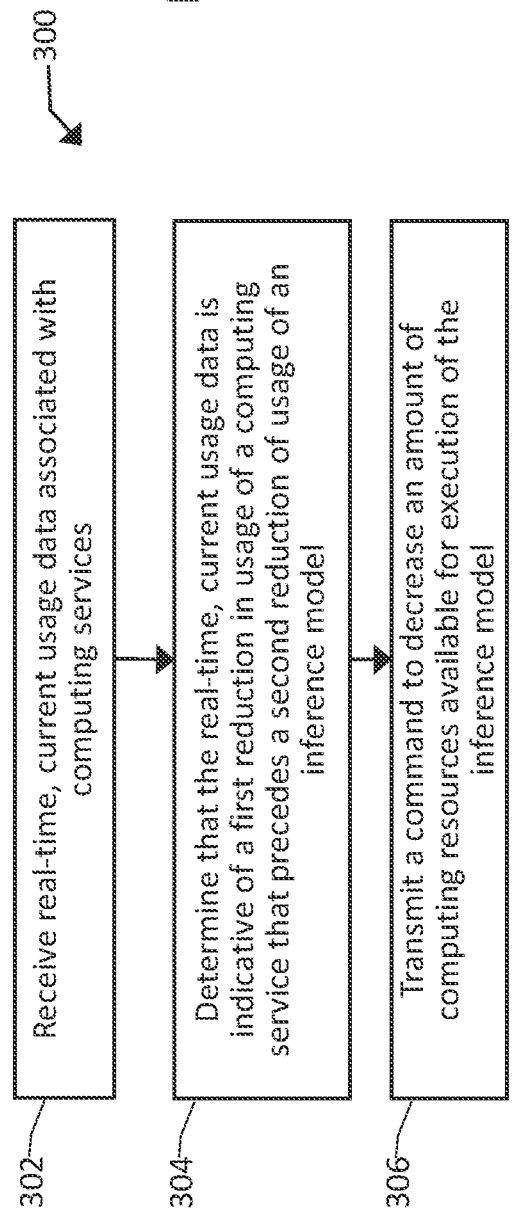
FIG. 3 is a flowchart illustrating a process for monitoring and predicting usage of computing services and inference models to scale down computing resources for use by those computing services and/or inference models in accordance with one or more embodiments of the present disclosure.

FIG. 3 is a flowchart illustrating a process 300 for monitoring and predicting usage of computing services and inference models to scale down computing resources for use by those computing services and/or inference models in accordance with one or more embodiments of the present disclosure. At an operation 302, real-time, current usage data associated with computing services is received. At an operation 304, it is determined that the real-time, current usage data is indicative of a first reduction in usage of a computing service that precedes a second reduction of usage of an inference model. At an operation 306, a command to decrease an amount of computing resources available for execution of the inference model is transmitted. In other words, using the process 300, a trained machine learning model may also receive real-time, current usage data associated with computing services to also predict when demand for an inference model will decrease. As such, the system can instruct a reduction in computing resources provided to serve an inference model based on that prediction.

In various embodiments, the machine learning model used to predict the future use of inference models may be different types of machine learning models or algorithms. For example, a recurrent neural network (RNN) may be used. In various embodiments, multiple models may be also be trained for the same inference model to focus on different timing factors. For example, a first model may focus on specific days of the year or week and learn how to predict inference model usage on a daily basis. A second model may be used to focus on weekly usage. A third model may be used that focuses on hourly (e.g., time of day) usage. Other models may be used that focus on months, years, holiday seasonality, minutes (e.g., time of day), portion of day (e.g., morning, afternoon, evening) or any other timing factor as desired. In various embodiments, the probabilistic behavior represented in the different models may be combined to determine the appropriate scaling of resources based on all the timing factors analyzed or accounted for by the various trained models. In various embodiments, one or more models may be trained/used that focus on more than one timing factor at a time. In any case, the system may account for different timing factors or trends so that the computing resources for an inference model may be appropriate scaled in a predictive manner.

Figure 4:
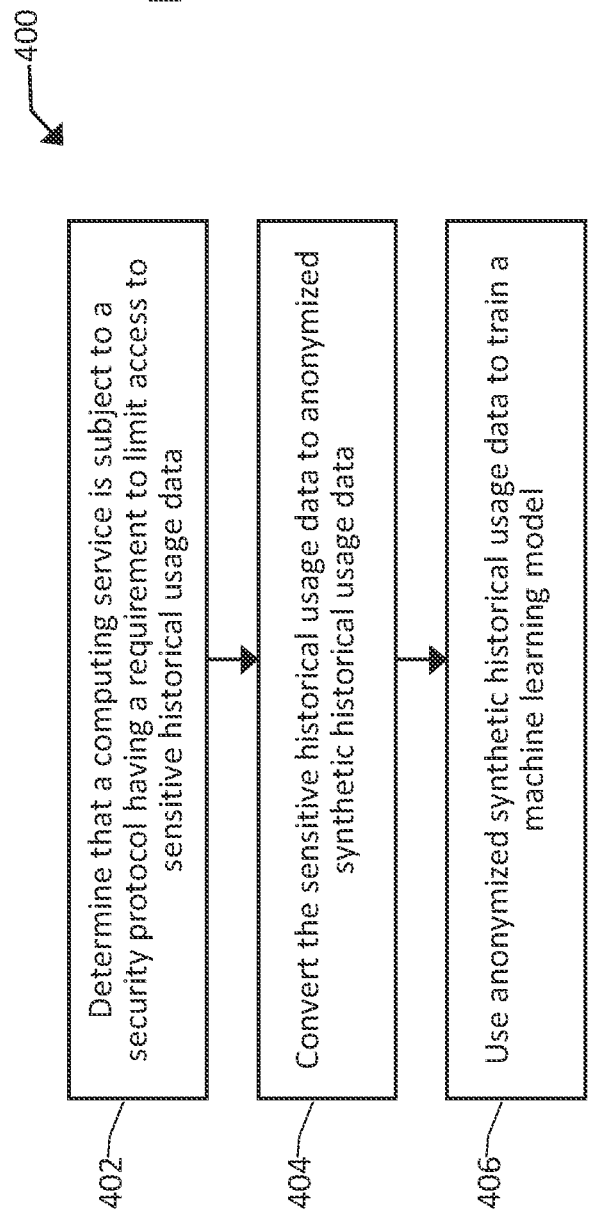
FIG. 4 is a flowchart illustrating a process for anonymizing historical usage data in accordance with one or more embodiments of the present disclosure.

FIG. 4 is a flowchart illustrating a process 400 for anonymizing historical usage data in accordance with one or more embodiments of the present disclosure. In various implementations, some of the usage data may be sensitive, governed by data protection or privacy laws, etc. Thus, an entity may have an interest in disseminating sensitive data as much as possible, even to internal parties within a given entity that controls that sensitive data. As such, provided herein are methods for anonymizing that sensitive data for use in the methods, systems, and computer readable media described herein. While the process 400 is described with respect to data relating to a computing service, data relating to an inference model may similarly be anonymized using a similar process.

At an operation 402, it is determined that a given computing service or its associated data is subject to a security protocol having a requirement to limit access to historical sensitive usage data of the computing service. At an operation 404, the historical usage data associated with the computing service is converted from sensitive historical usage data to synthetic usage data, such that the synthetic usage data is an anonymized version of the sensitive historical usage data. At an operation 406, that anonymized, synthetic historical usage data may then be used as the historical usage data described herein to input into and train a machine learning model.

Figure 5:
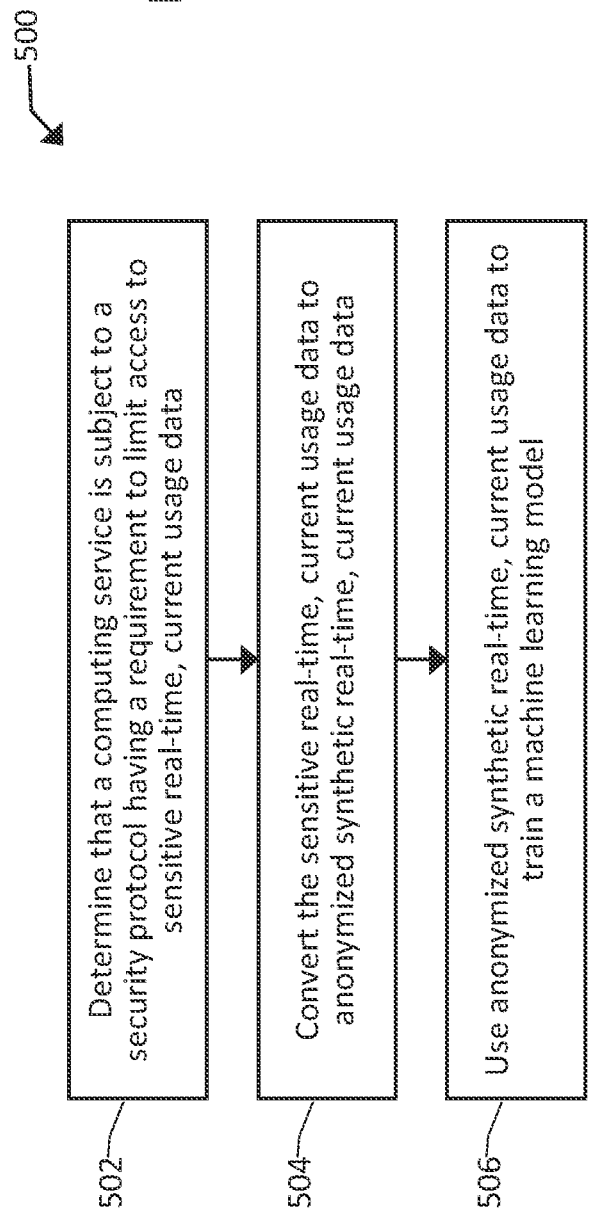
FIG. 5 is a flowchart illustrating a process for anonymizing real-time, current usage data in accordance with one or more embodiments of the present disclosure.

FIG. 5 is a flowchart illustrating a process 500 for anonymizing real-time, current usage data in accordance with one or more embodiments of the present disclosure. The process 500 is similar to the process 400 of FIG. 4, but relates to real-time, current usage data. In this way, the systems and methods described herein may also utilize anonymized data when using a trained machine learning model to predict usage spikes and decreases for an inference model.

At an operation 502, it is determined that a given computing service or its associated data is subject to a security protocol having a requirement to limit access to real-time, current sensitive usage data of the computing service. At an operation 504, the real-time, current usage data associated with the computing service is converted from sensitive usage data to synthetic usage data, such that the synthetic usage data is an anonymized version of the sensitive real-time, current usage data. At an operation 506, that anonymized, synthetic historical usage data may then be used as the real-time, current usage data described herein to input into a trained machine learning model and output predictions about the demand for an inference model.

As such, described herein are systems, methods, and computer readable media for training a machine learning model to recognize patterns of usage of varying computing services (e.g., websites, apps) that are indicative of or correlated to changes in usage of an inference model. Once such a machine learning model is trained, that trained machine learning model may be used to predict when demand for the inference model will go up or down, and the system may allocate computing resources for that inference model in accordance with those predictions.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein, and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

Figure 6:
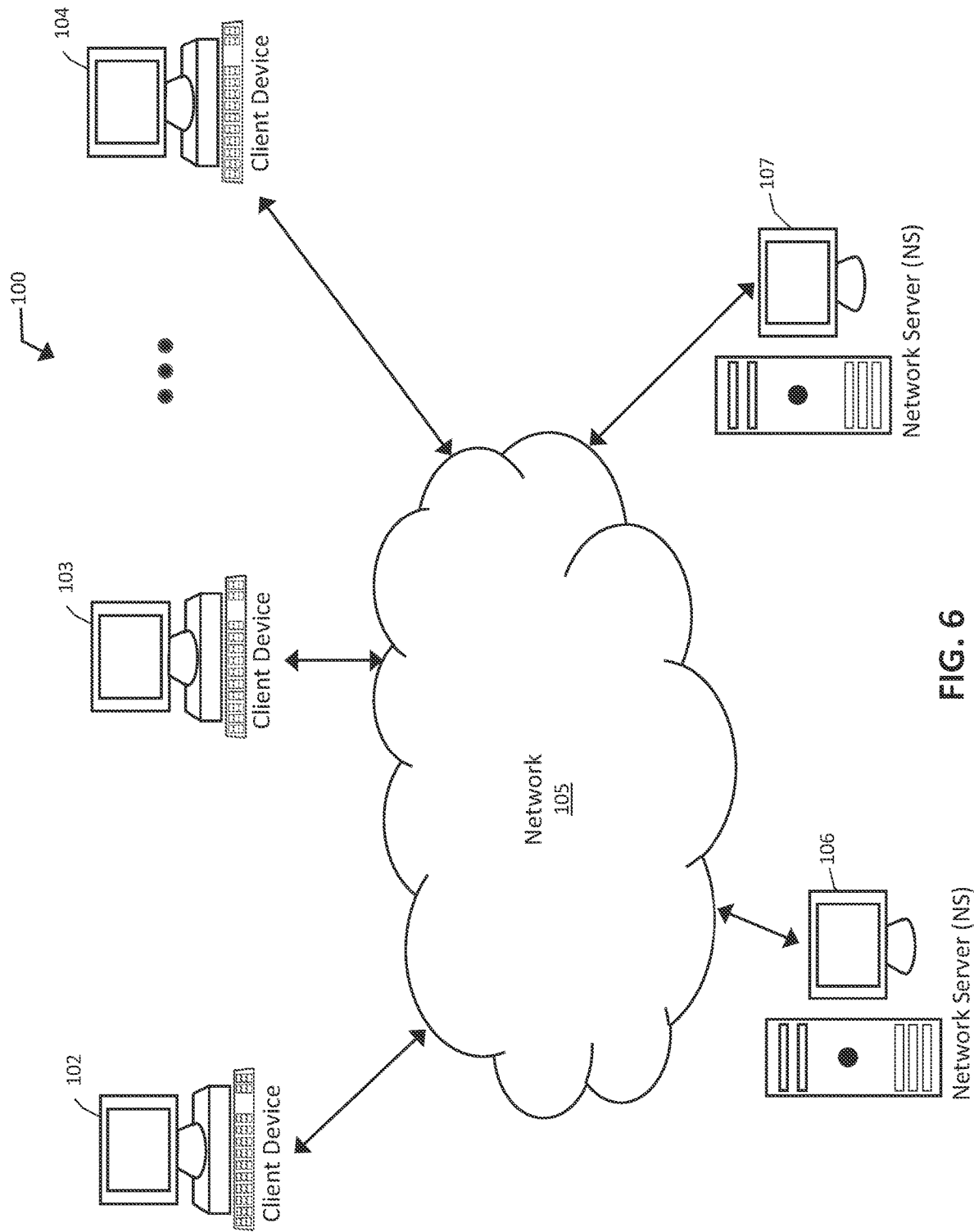
FIG. 6 is a block diagram depicting a computer-based system and platform in accordance with one or more embodiments of the present disclosure.

FIG. 6 is a block diagram depicting a computer-based system and platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 100 may be configured to manage a large number of members and/or concurrent transactions, as detailed herein. In some embodiments, the exemplary computer-based system/platform 100 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 6, members 102-104 (e.g., clients) of the exemplary computer-based system/platform 100 may include virtually any computing device capable of receiving and sending a message over a network (e.g., cloud network), such as network 105, to and from another computing device, such as servers 106 and 107, each other, and the like. In some embodiments, the member devices 102-104 may be personal computers, multiprocessor systems, microprocessor-based or programmable consumer electronics, network PCs, and the like. In some embodiments, one or more member devices within member devices 102-104 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 102-104 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 102-104 may include may run one or more applications, such as Internet browsers, mobile applications, voice calls, video games, videoconferencing, and email, among others. In some embodiments, one or more member devices within member devices 102-104 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 102-104 may be specifically programmed by either Java, .Net, QT, C, C++ and/or other suitable programming language. In some embodiments, one or more member devices within member devices 102-104 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 105 may provide network access, data transport and/or other services to any computing device coupled to it. In some embodiments, the exemplary network 105 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 105 may include and implement, as an alternative or in conjunction with one or more of the above, a WiMAX architecture defined by the WiMAX forum. In some embodiments and, optionally, in combination of any embodiment described above or below, the exemplary network 105 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 105 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 105 may also include mass storage, such as network attached storage (NAS), a storage area network (SAN), a content delivery network (CDN) or other forms of computer or machine readable media.

In some embodiments, the exemplary server 106 or the exemplary server 107 may be a web server (or a series of servers) running a network operating system, examples of which may include but are not limited to Microsoft Windows Server, Novell NetWare, or Linux. In some embodiments, the exemplary server 106 or the exemplary server 107 may be used for and/or provide cloud and/or network computing. Although not shown in FIG. 6, in some embodiments, the exemplary server 106 or the exemplary server 107 may have connections to external systems like email, SMS messaging, text messaging, ad content providers, etc. Any of the features of the exemplary server 106 may be also implemented in the exemplary server 107 and vice versa.

In some embodiments, one or more of the exemplary servers 106 and 107 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 101-104.

In some embodiments and, optionally, in combination of any embodiment described above or below, for example, one or more exemplary computing member devices 102-104, the exemplary server 106, and/or the exemplary server 107 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
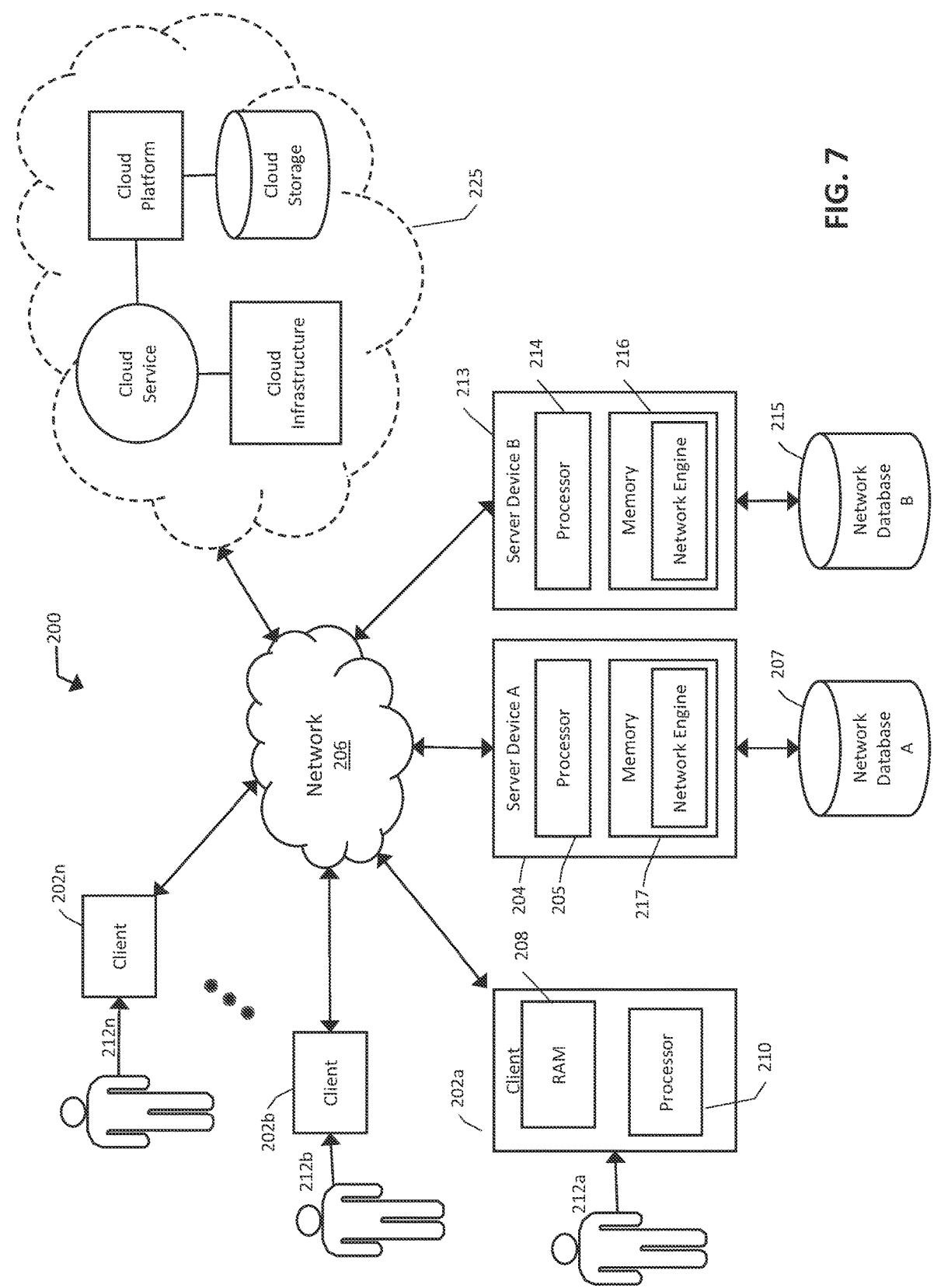
FIG. 7 is a block diagram depicting another computer-based system and platform in accordance with one or more embodiments of the present disclosure.

FIG. 7 depicts a block diagram of another exemplary computer-based system/platform 200 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 202a, 202b through 202n shown each at least includes a computer-readable medium, such as a random-access memory (RAM) 208 coupled to a processor 210 or FLASH memory. In some embodiments, the processor 210 may execute computer-executable program instructions stored in memory 208. In some embodiments, the processor 210 may include a microprocessor, an ASIC, and/or a state machine. In some embodiments, the processor 210 may include, or may be in communication with, media, for example computer-readable media, which stores instructions that, when executed by the processor 210, may cause the processor 210 to perform one or more steps described herein. In some embodiments, examples of computer-readable media may include, but are not limited to, an electronic, optical, magnetic, or other storage or transmission device capable of providing a processor, such as the processor 210 of client 202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 202a through 202n may also comprise a number of external or internal devices such as a mouse, a CD-ROM, DVD, a physical or virtual keyboard, a display, or other input or output devices. In some embodiments, examples of member computing devices 202a through 202n (e.g., clients) may be any type of processor-based platforms that are connected to a network 206 such as, without limitation, personal computers, digital assistants, personal digital assistants, smart phones, pagers, digital tablets, laptop computers, Internet appliances, and other processor-based devices. In some embodiments, member computing devices 202a through 202n may be specifically programmed with one or more application programs in accordance with one or more principles/methodologies detailed herein. In some embodiments, member computing devices 202a through 202n may operate on any operating system capable of supporting a browser or browser-enabled application, such as Microsoft™ Windows™, and/or Linux. In some embodiments, member computing devices 202a through 202n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 202a through 202n, users 212a through 212n, may communicate over the exemplary network 206 with each other and/or with other systems and/or devices coupled to the network 206. As shown in FIG. 7, exemplary server devices 204 and 213 may be also coupled to the network 206. In some embodiments, one or more member computing devices 202a through 202n may be mobile clients.

In some embodiments, at least one database of exemplary databases 207 and 215 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
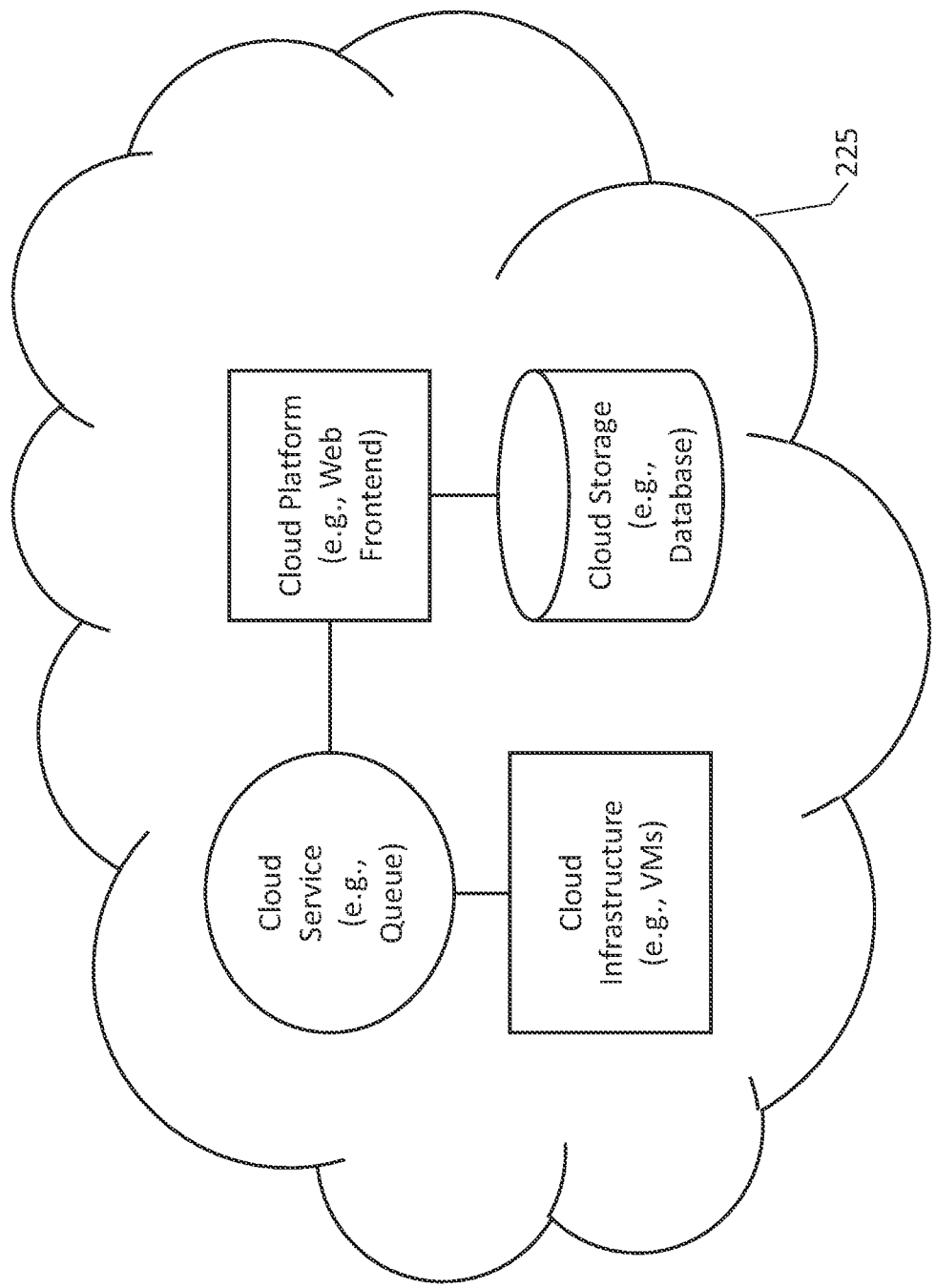
FIGS. 8 and 9 are diagrams illustrating implementations of cloud computing architecture/aspects with respect to which the disclosed technology may be specifically configured to operate, in accordance with one or more embodiments of the present disclosure.
Figure 9:
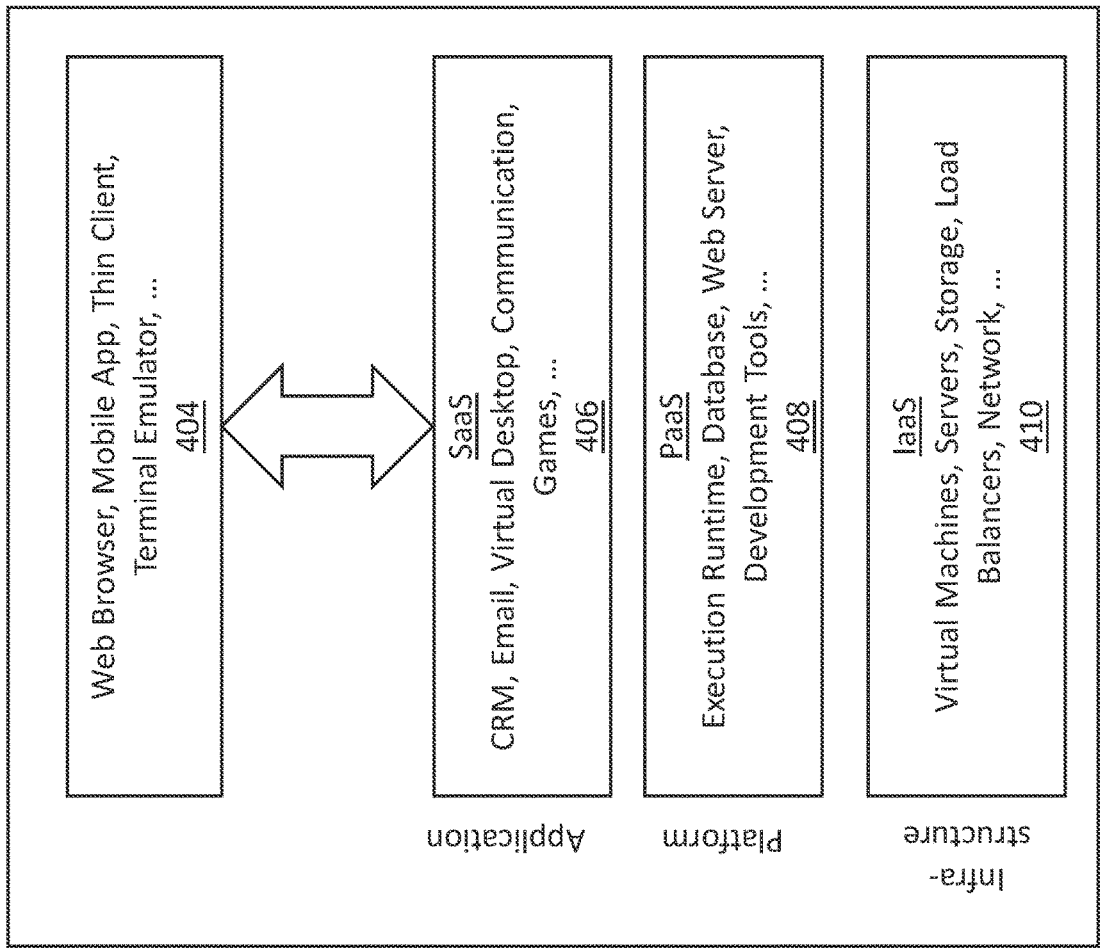

As also shown in FIGS. 7-9, some embodiments of the disclosed technology may also include and/or involve one or more cloud components 225, which are shown grouped together in the drawing for sake of illustration, though may be distributed in various ways as known in the art. Cloud components 225 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 9, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 410, platform as a service (PaaS) 408, and/or software as a service (SaaS) 406. FIGS. 8 and 9 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate.

At least some aspects of the present disclosure will now be described with reference to the following numbered clauses.

1. A method including:
    receiving, by one or more processors of one or more computing devices, historical usage data associated with:
        a plurality of computing services provided by a plurality of distributed servers, and
        an inference model associated with at least one of the plurality of computing services, where the inference model is configured to receive a request and make an inference based on the request;
    training, by the one or more processors based on the historical usage data, a machine learning model to determine a correlation between a first usage of at least one first computing service of the plurality of computing services and a second usage of the inference model, where the correlation indicates that at least one first spike in the first usage of the at least one first computing service precedes at least one second spike in the second usage of the inference model;
    receiving, by the one or more processors, in real-time, current usage data associated with the at least one first computing service of the plurality of computing services;
    determining, by the one or more processors based on the current usage data and the correlation, in real-time, that the current usage data is indicative of the at least one first spike in the first usage of the at least one first computing service that precedes the at least one second spike in the second usage of the inference model; and
    transmitting, by the one or more processors in response to the determination that the current usage data is indicative of the at least one first spike in the first usage of the at least one first computing service, in real-time, at least one command to increase an amount of computing resources available for an execution of the inference model.

2. The method of clause 1, where the at least one command to increase the amount of computing resources available for the execution of the inference model includes one or more of:
    instructions to allocate additional graphics processing units (GPUs) or central processing units (CPUs) for use by the inference model;
    instructions to allocate additional memory for use by the inference model; or
    instructions to allocate additional nodes of a cloud computing service for use by the inference model.

3. The method of clause 1, where the inference model includes one or more of a credit checking service, a credit limit estimation service, a line of credit approval service, or a transaction fraud protection monitoring service.

4. The method of clause 3, where the at least one first computing service of the plurality of computing services includes one or more of a website provider service, an advertisement provider service, an in-store traffic monitoring service, a transaction or purchase tracking service, a game console service.

5. The method of clause 1, where the inference model includes an electronic message risk scanning service and the at least one first computing service of the plurality of computing services includes an electronic message sending and receiving service.

6. The method of clause 1, where the at least one first computing service of the plurality of computing services is subject to a security protocol including a requirement to limit access to historical sensitive usage data of the at least one first computing service.

7. The method of clause 6, further including generating, by the one or more processors, the historical usage data associated with the at least one first computing service by converting the sensitive historical usage data to synthetic usage data, where the synthetic usage data includes an anonymized version of the sensitive historical usage data.

8. The method of clause 1, where the at least one first computing service of the plurality of computing services is subject to a security protocol including a requirement to limit access to sensitive current usage data of the at least one first computing service.

9. The method of clause 8, further including generating, by the one or more processors, the current usage data associated with the at least one first computing service by converting the sensitive current usage data to synthetic usage data, where the synthetic usage data includes an anonymized version of the sensitive current usage data.

10. The method of clause 1, the receiving of the historical usage data includes monitoring, by the one or more processors, the first usage of the at least one first computing service by monitoring a number of application programming interface (API) calls into and/or out of the at least one first computing service.

11. The method of clause 1, where the correlation is a first correlation, the at least one command includes a first command, the current usage data is first current usage data, and further where the method includes:
   training, by the one or more processors, the machine learning model to determine a second correlation between a third usage of the at least one first computing service of the plurality of computing services and a fourth usage of the inference model, where the second correlation indicates that at least one first reduction in the third usage of the at least one first computing service precedes at least one second reduction in the fourth usage of the inference model;
   receiving, by the one or more processors, in real-time, second current usage data associated with the at least one first computing service of the plurality of computing services;
   determining, by the one or more processors based on the second current usage data and the second correlation, in real-time, that the second current usage data is indicative of the at least one first reduction in the third usage of the at least one first computing service that precedes the at least one second reduction in the fourth usage of the inference model;
   transmitting, by the one or more processors in response to the determination that the current usage data includes the at least one first reduction in the third usage of the at least one first computing service, in real-time, at least one second command to decrease the amount of computing resources available for the execution of the inference model.

12. The method of clause 1, where at least some of the historical usage data is received from the plurality of distributed servers.

13. A system including:
   a memory;
   at least one processor coupled to the memory, the at least one processor configured to:
   receive historical usage data associated with:
      a plurality of computing services provided by a plurality of distributed servers, and
      an inference model associated with at least one of the plurality of computing services, where the inference model is configured to receive a request and make an inference based on the request;
   train, based on the historical usage data, a machine learning model to determine a correlation between a first usage of at least one first computing service of the plurality of computing services and a second usage of the inference model, where the correlation indicates that at least one first spike in the first usage of the at least one first computing service precedes at least one second spike in the second usage of the inference model; and
   generate, based on the correlation, resource scheduling instructions configured to, upon execution by a computing device, increase an amount of computing resources available for an execution of the inference model in response to making a determination, in real-time, that current usage data of the at least one first computing service indicates the at least one first spike in the first usage of the at least one first computing service.

14. The system of clause 13, where at least one processor is further configured to receive the historical usage data by monitoring the first usage of the at least one first computing service by monitoring a number of application programming interface (API) calls into and/or out of the at least one first computing service.

15. The system of clause 13, where the historical usage data is received from the plurality of distributed servers.

16. The system of clause 13, where the determination of the correlation by the machine learning is further based on a determination of an approximate amount of time that elapses between the at least one first spike in the first usage of the at least one first computing service and the at least one second spike in the second usage of the inference model.

17. The system of clause 13, where the correlation is a first correlation, the resource scheduling instructions are first resource scheduling instructions, the current usage data is first current usage data, and where the at least one processor is further configured to:
   train the machine learning model to determine a second correlation between a third usage of the at least one first computing service of the plurality of computing services and a fourth usage of the inference model, where the second correlation indicates that at least one first reduction in the third usage of the at least one first computing service precedes at least one second reduction in the fourth usage of the inference model;
   generate, based on the second correlation, second resource scheduling instructions configured to, upon execution by the computing device, decrease the amount of computing resources available for the execution of the inference model in response to making a determination, in real-time, that second current usage data of the at least one first computing service indicates the at least one first reduction in the third usage of the at least one first computing service.

18. A non-transitory computer readable medium having instructions stored thereon that, upon execution by a computing device, cause the computing device to perform operations including:
   receiving resource scheduling instructions configured to, upon execution by the computing device, increase an amount of computing resources available for an execution of an inference model, where:
      the resource scheduling instructions are associated with a correlation between a first usage of at least one first computing service of the plurality of computing services and at least one second usage of the inference model;
      the correlation indicates that at least one first spike in the first usage of the at least one first computing service precedes at least one second spike in the second usage of the inference model;
      the plurality of computing services are provided by a plurality of distributed servers; and
      the inference model is configured to receive a request and make an inference based on the request; and
   executing the resource scheduling instructions including:
      receiving, in real-time, the current usage data associated with the at least one first computing service;
      determining, in real-time, that the current usage data is indicative of the at least one first spike in the first usage of the at least one first computing service that precedes the at least one second spike in the second usage of the inference model; and
      transmitting, in response to the determining that the current usage data is indicative of the at least one first spike in the first usage of the at least one first computing service, in real-time, at least one command to increase the amount of computing resources available for the execution of the inference model.

19. The non-transitory computer readable medium of clause 18, where the at least one command is a first command, the current usage data is first current usage data, and further where executing the resource scheduling instructions further includes:
   receiving, in real-time, second current usage data associated with the at least one first computing service;
   determining, in real-time, that the second current usage data is indicative of at least one first reduction in a third usage of the at least one first computing service that precedes at least one second reduction in the fourth usage of the inference model; and
   transmitting, in response to the determining that the second current usage data is indicative of the at least one first reduction in the third usage of the at least one first computing service, in real-time, at least one second command to decrease the amount of computing resources available for the execution of the inference model.

20. The non-transitory computer readable medium of clause 18, where the determining that the current usage data is indicative of the at least one first spike in the first usage of the at least one first computing service includes monitoring a number of application programming interface (API) calls into and/or out of the at least one first computing service.

As used herein, the terms "computer engine" and "engine" identify at least one software component and/or a combination of at least one software component and at least one hardware component which are designed/programmed/ configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/ PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIGS. 8 and 9) and cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux™, (2) Microsoft Windows™, (3) OS X (Mac OS), (4) Solaris™, (5) UNIX™ (6) VMWare™, (7) Android™, (8) Java Platforms™, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTR0, SHA-1, SHA-2, Tiger (TTH), WHIRLPOOL, RNGs).

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:
   receiving, by one or more processors of one or more computing devices, historical usage data associated with:
     a plurality of computing services provided by a plurality of distributed servers, and
     an inference model associated with at least one of the plurality of computing services, wherein the inference model is configured to receive a request and make an inference based on the request;
   training, by the one or more processors based on the historical usage data, a machine learning model to determine a correlation between a first usage of at least one first computing service of the plurality of computing services and a second usage of the inference model, wherein the correlation indicates that at least one first spike in the first usage of the at least one first computing service precedes at least one second spike in the second usage of the inference model;
   receiving, by the one or more processors, in real-time, current usage data associated with the at least one first computing service of the plurality of computing services;
   determining, by the one or more processors based on the current usage data and the correlation, in real-time, that the current usage data is indicative of the at least one first spike in the first usage of the at least one first computing service that precedes the at least one second spike in the second usage of the inference model; and
   transmitting, by the one or more processors in response to the determination that the current usage data is indicative of the at least one first spike in the first usage of the at least one first computing service, in real-time, at least one command thereby causing an increase in an amount of computing resources available for an execution of the inference model.

2. The method of claim 1, wherein the at least one command to increase the amount of computing resources available for the execution of the inference model comprises one or more of:
   instructions to allocate additional graphics processing units (GPUs) or central processing units (CPUs) for use by the inference model;
   instructions to allocate additional memory for use by the inference model; or
   instructions to allocate additional nodes of a cloud computing service for use by the inference model.

3. The method of claim 1, wherein the inference model comprises one or more of a credit checking service, a credit limit estimation service, a line of credit approval service, or a transaction fraud protection monitoring service.

4. The method of claim 3, wherein the at least one first computing service of the plurality of computing services comprises one or more of a website provider service, an advertisement provider service, an in-store traffic monitoring service, a transaction or purchase tracking service, a game console service.

5. The method of claim 1, wherein the inference model comprises an electronic message risk scanning service and the at least one first computing service of the plurality of computing services comprises an electronic message sending and receiving service.

6. The method of claim 1, wherein the at least one first computing service of the plurality of computing services is subject to a security protocol comprising a requirement to limit access to historical sensitive usage data of the at least one first computing service.

7. The method of claim 6, further comprising generating, by the one or more processors, the historical usage data associated with the at least one first computing service by converting the historical sensitive usage data to synthetic usage data, wherein the synthetic usage data comprises an anonymized version of the historical sensitive usage data.

8. The method of claim 1, wherein the at least one first computing service of the plurality of computing services is subject to a security protocol comprising a requirement to limit access to sensitive current usage data of the at least one first computing service.

9. The method of claim 8, further comprising generating, by the one or more processors, the current usage data associated with the at least one first computing service by converting the sensitive current usage data to synthetic usage data, wherein the synthetic usage data comprises an anonymized version of the sensitive current usage data.

10. The method of claim 1, the receiving of the historical usage data comprises monitoring, by the one or more processors, the first usage of the at least one first computing service by monitoring a number of application programming interface (API) calls into and/or out of the at least one first computing service.

11. The method of claim 1, wherein the correlation is a first correlation, the at least one command comprises a first command, the current usage data is first current usage data, and further wherein the method comprises:
   training, by the one or more processors, the machine learning model to determine a second correlation between a third usage of the at least one first computing service of the plurality of computing services and a fourth usage of the inference model, wherein the second correlation indicates that at least one first reduction in the third usage of the at least one first computing service precedes at least one second reduction in the fourth usage of the inference model;
   receiving, by the one or more processors, in real-time, second current usage data associated with the at least one first computing service of the plurality of computing services;
   determining, by the one or more processors based on the second current usage data and the second correlation, in real-time, that the second current usage data is indicative of the at least one first reduction in the third usage of the at least one first computing service that precedes the at least one second reduction in the fourth usage of the inference model; and
   transmitting, by the one or more processors in response to the determination that the current usage data comprises the at least one first reduction in the third usage of the at least one first computing service, in real-time, at least one second command to decrease the amount of computing resources available for the execution of the inference model.

12. The method of claim 1, wherein at least some of the historical usage data is received from the plurality of distributed servers.

13. A system comprising:
a memory; and
at least one processor coupled to the memory, the at least one processor configured to: receive historical usage data associated with:
a plurality of computing services provided by a plurality of distributed servers, and an inference model associated with at least one of the plurality of computing services, wherein the inference model is configured to receive a request and make an inference based on the request;
train, based on the historical usage data, a machine learning model to determine a correlation between a first usage of at least one first computing service of the plurality of computing services and a second usage of the inference model, wherein the correlation indicates that at least one first spike in the first usage of the at least one first computing service precedes at least one second spike in the second usage of the inference model;
generate, based on the correlation, resource scheduling instructions configured to increase an amount of computing resources available for an execution of the inference model in response to making a determination, in real-time, that current usage data of the at least one first computing service indicates the at least one first spike in the first usage of the at least one first computing service; and
execute the resource scheduling instructions thereby causing the increase in the amount of computing resources available for the execution of the inference model.

14. The system of claim 13, wherein at least one processor is further configured to receive the historical usage data by monitoring the first usage of the at least one first computing service by monitoring a number of application programming interface (API) calls into and/or out of the at least one first computing service.

15. The system of claim 13, wherein the historical usage data is received from the plurality of distributed servers.

16. The system of claim 13, wherein the determination of the correlation by the machine learning model is further based on a determination of an approximate amount of time that elapses between the at least one first spike in the first usage of the at least one first computing service and the at least one second spike in the second usage of the inference model.

17. The system of claim 13, wherein the correlation is a first correlation, the resource scheduling instructions are first resource scheduling instructions, the current usage data is first current usage data, and wherein the at least one processor is further configured to:
train the machine learning model to determine a second correlation between a third usage of the at least one first computing service of the plurality of computing services and a fourth usage of the inference model, wherein the second correlation indicates that at least one first reduction in the third usage of the at least one first computing service precedes at least one second reduction in the fourth usage of the inference model; and
generate, based on the second correlation, second resource scheduling instructions configured to, upon execution by the computing device, decrease the amount of computing resources available for the execution of the inference model in response to making a determination, in real-time, that second current usage data of the at least one first computing service indicates the at least one first reduction in the third usage of the at least one first computing service.

18. A non-transitory computer readable medium having instructions stored thereon that, upon execution by a computing device, cause the computing device to perform operations comprising:
receiving resource scheduling instructions configured to, upon execution by the computing device, increase an amount of computing resources available for an execution of an inference model, wherein:
the resource scheduling instructions are associated with a correlation between a first usage of at least one first computing service of a plurality of computing services and at least one second usage of the inference model;
the correlation indicates that at least one first spike in the first usage of the at least one first computing service precedes at least one second spike in a second usage of the inference model; the plurality of computing services are provided by a plurality of distributed servers; and
the inference model is configured to receive a request and make an inference based on the request; and executing the resource scheduling instructions comprising:
receiving, in real-time, current usage data associated with the at least one first computing service;
determining, in real-time, that the current usage data is indicative of the at least one first spike in the first usage of the at least one first computing service that precedes the at least one second spike in the second usage of the inference model; and
transmitting, in response to the determining that the current usage data is indicative of the at least one first spike in the first usage of the at least one first computing service, in real-time, at least one command thereby causing an increase in the amount of computing resources available for the execution of the inference model.

19. The non-transitory computer readable medium of claim 18, wherein the at least one command is a first command, the current usage data is first current usage data, and further wherein executing the resource scheduling instructions further comprises:
receiving, in real-time, second current usage data associated with the at least one first computing service;
determining, in real-time, that the second current usage data is indicative of at least one first reduction in a third usage of the at least one first computing service that precedes at least one second reduction in a fourth usage of the inference model; and
transmitting, in response to the determining that the second current usage data is indicative of the at least one first reduction in the third usage of the at least one first computing service, in real-time, at least one second command to decrease the amount of computing resources available for the execution of the inference model.

20. The non-transitory computer readable medium of claim 18, wherein the determining that the current usage data is indicative of the at least one first spike in the first usage of the at least one first computing service comprises monitoring a number of application programming interface (API) calls into and/or out of the at least one first computing service.

* * * * *